US012803659B2

(12) United States Patent
Cho

(10) Patent No.: US 12,803,659 B2
(45) Date of Patent: Nov. 17, 2026

(54) SATELLITE TERMINAL RECEIVER AND MODEM PERFORMANCE EVALUATION METHOD USING SAME

(71) Applicant: Defense Agency for Technology and Quality, Gyeongsangnam-do (KR)

(72) Inventor: Tae Chong Cho, Seoul (KR)

(73) Assignee: Defense Agency for Technology and Quality, Gyeongsangnam-do (KR)

( * ) Notice: Subject to any disclaimer, the term of this patent is extended or adjusted under 35 U.S.C. 154(b) by 548 days.

(21) Appl. No.: 18/265,988

(22) PCT Filed: Dec. 8, 2021

(86) PCT No.: PCT/KR2021/018534
§ 371 (c)(1),
(2) Date: Jun. 8, 2023

(87) PCT Pub. No.: WO2022/124791
PCT Pub. Date: Jun. 16, 2022

(65) Prior Publication Data

US 2024/0039624 A1 Feb. 1, 2024

(30) Foreign Application Priority Data

Dec. 8, 2020 (KR) ........................ 10 2020-0170378

(51) Int. Cl.
*H04B 7/185* (2006.01)
*H04B 1/10* (2006.01)

(52) U.S. Cl.
CPC ....... *H04B 7/18515* (2013.01); *H04B 1/1027* (2013.01)

(58) Field of Classification Search
CPC .................................................. H04B 7/18515
See application file for complete search history.

(56) References Cited

U.S. PATENT DOCUMENTS 5,909,645 A * 6/1999 Abramsky ........... H03G 3/3068 455/249.1
9,960,866 B1 * 5/2018 Zhuang ................ H04B 17/336
(Continued)

FOREIGN PATENT DOCUMENTS

JP 2013-038509 3/2013
KR 10-2018-0117487 10/2018
(Continued)

OTHER PUBLICATIONS

International Search Report and the Written Opinion Dated Mar. 29, 2022 From the International Searching Authority Re. Application No. PCT/KR2021/018534 and its Translation of Search Report Into English. (11 Pages).
(Continued)

*Primary Examiner* — Yuwen Pan

(57) ABSTRACT

The present application provides a satellite receiver comprising: an antenna unit for receiving a satellite signal; a transmission line unit comprising a bandpass filter for selecting a reception band of the satellite signal, and a variable attenuator for generating artificial noise in the satellite signal which has passed through the filter; a low noise amplifier and converter for carrying out low noise amplification and frequency conversion of the satellite signal in which the artificial noise has been generated; and a modem for receiving, from the low noise amplifier and converter, a signal-to-noise ratio (SNR) of the satellite signal.

7 Claims, 1 Drawing Sheet

(56) References Cited

U.S. PATENT DOCUMENTS

| | | | | |
|---|---|---|---|---|
| 2003/0181178 A1* | 9/2003 | Zerod | .................. | H03G 3/3068 455/234.1 |
| 2011/0085626 A1* | 4/2011 | Busson | .................. | H04B 7/084 455/296 |
| 2020/0322044 A1* | 10/2020 | Knopp | ................. | H04B 7/0413 |

FOREIGN PATENT DOCUMENTS

| | | |
|---|---|---|
| KR | 10-2018-0122364 | 11/2018 |
| KR | 10-2247538 | 5/2021 |
| WO | WO 2016/203742 | 12/2016 |

OTHER PUBLICATIONS

Bazile et al. "Performances of Low SNR DVB-RCS Modem Using Test Frequency Algorithm", 2006 IEEE International Conference on Acoustics Speech and Signal Processing Proceedings, ICASSPP 2006, Toulouse, France, May 14-19, 2006, p. III-1212-III-1215, May 14, 2006.

Cho "An Artificial Noise Generation Method for MODEM Performance Test in Satellite Communication System", The Journal of The Institute of Internet, Broadcasting and Communication, IIBC, 20(4): 59-64, Aug. 31, 2020 & English Abstract.

* cited by examiner

SATELLITE TERMINAL RECEIVER AND MODEM PERFORMANCE EVALUATION METHOD USING SAME

RELATED APPLICATION

This application is a National Phase of PCT Patent Application No. PCT/KR2021/018534 having International filing date of Dec. 8, 2021, which claims the benefit of priority of Korean Patent Application No. 10-2020-0170378 filed on Dec. 8, 2020. The contents of the above applications are all incorporated by reference as if fully set forth herein in their entirety.

FIELD AND BACKGROUND OF THE INVENTION

The present invention relates to a satellite receiver and a method of evaluating performance of a modem using the same, and more specifically, to a satellite receiver capable of self-adjusting a signal-to-noise ratio (SNR) of a satellite signal without aid of a separate external device, and a method of evaluating performance of a modem using the same.

Generally, a satellite communication system is composed of a satellite transmitter, a transponder, and a satellite receiver. The satellite transmitter and the satellite receiver are equipment on the ground, and the transponder is a satellite or a simulator located on the ground.

Specifically, when the satellite transmitter transmits a signal, the transponder receives the signal. And the transponder changes a frequency of the received signal to a reception frequency and transmits the signal to the satellite receiver for communication. Not only communication is performed using the same type of terminals, but also different types of transmitter and receiver could be operated.

Meanwhile, Modem tests in satellite communication systems are required to check the performance. In the modem performance test, whether the modem is good or not is evaluated using a bit error rate (BER) value which is related to a signal-to-noise ratio (SNR) and specified in the requirements of the modem.

Specifically, the test is performed when the SNR has a low value in consideration of an abnormal communication environment. For reference, in a normal communication environment, a signal entering a modem of a receiver is usually clean and has a very high SNR.

That is, in order to check the performance of the modem in the satellite communication system, it is possible to perform the test by artificially making an abnormal communication environment to lower the SNR.

As a conventional technique for adjusting an SNR, there is a method using a transmission strength of a transponder. However, this method takes a lot of time, and when a test is performed through a ground simulator, there is a problem because a physical distance between a satellite receiver and the simulator is long, and it is difficult to adjust the SNR immediately. If a real satellite is used instead of the simulator, it is more difficult to test the SNR because many steps must be taken to adjust the transmission strength of the satellite.

Using a noise generator is another method for adjusting SNR. However, this method can be performed when a reliable noise generator is provided, therefore it costs a lot.

SUMMARY OF THE INVENTION

The present invention is directed to solving the above problems and providing a satellite receiver which is capable of self-adjusting a signal-to-noise ratio (SNR) of a signal without aid of a separate external device and being used for a modem test to check performance.

One aspect of the present invention provides a satellite receiver including an antenna unit configured to receive a satellite signal; a transmission line unit including a bandpass filter for selecting a reception band of the satellite signal and a variable attenuator for generating artificial noise in the satellite signal which passes through the bandpass filter; a low-noise block configured to perform low noise amplification and frequency conversion of the satellite signal in which the artificial noise is generated; and a modem configured to receive a signal-to-noise ratio (SNR) of the satellite signal from the low-noise block.

As described above, a satellite receiver related to at least one of embodiments of the present invention includes a variable attenuator that generates artificial noise in a satellite signal, at a stage before a low-noise block, and thus the satellite receiver can self-adjust a signal-to-noise ratio (SNR) without aid of a separate external device and can be used for a modem test to check the performance of a modem.

DESCRIPTION OF SPECIFIC EMBODIMENTS OF THE INVENTION

Hereinafter, a satellite receiver of the present invention will be described with reference to the accompanying drawings.

Some terms used in the present invention are defined by considering functions in the present invention, and meanings may vary depending on, for example, a user or operator's intentions or customs. Therefore, the meanings of terms should be interpreted based on the scope throughout this specification.

In addition, embodiments of the present invention do not limit the scope of the present invention, but should be considered in a descriptive sense only, and include elements that are included in the technical spirit throughout the specification of the present invention and can be substituted with equivalents in the elements of the claims.

Further, although the selectively described terms in the embodiments below are used to distinguish one element from another element, these elements are not limited by these terms.

Accordingly, in describing the present invention, when it is determined that detailed descriptions of related well-known functions unnecessarily obscure the gist of the present invention, detailed descriptions thereof will be omitted.

Figure 1:
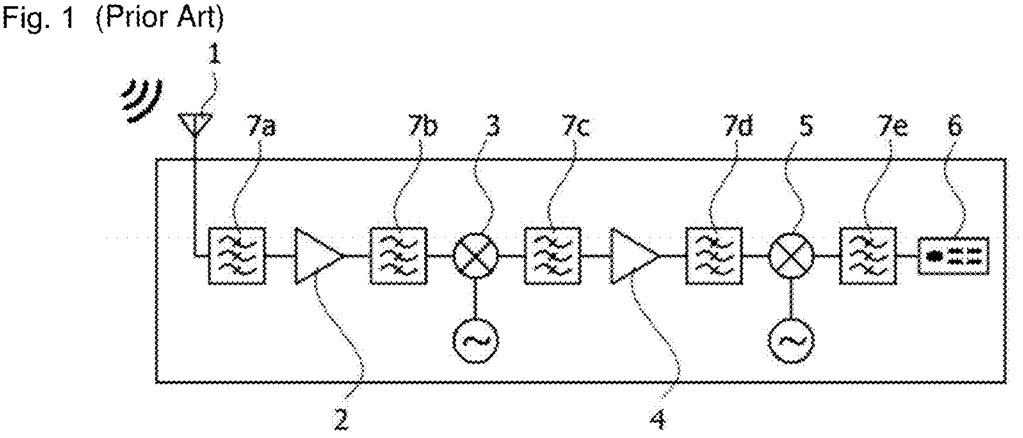
Fig. 1 (Prior Art)
FIG. 1 is a configuration diagram of a general heterodyne receiver in satellite system.
Figure 2:
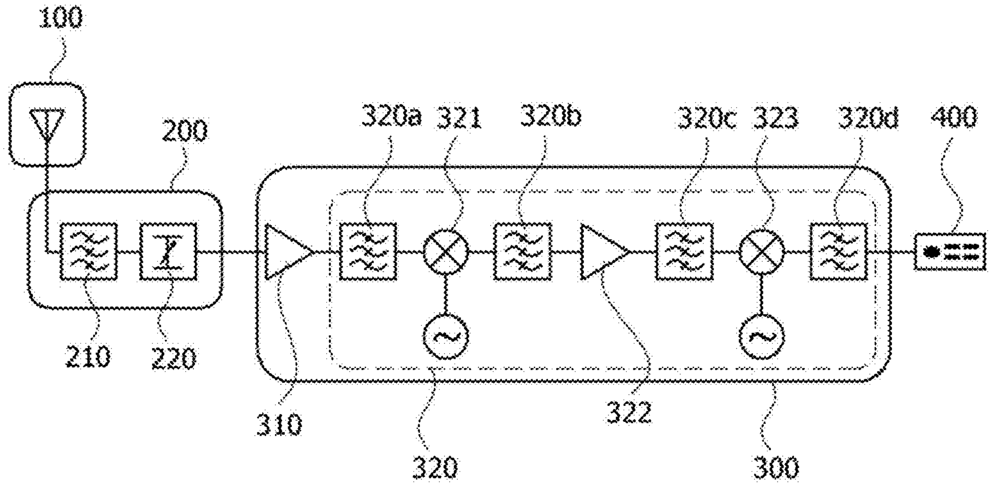
FIG. 2 is a configuration diagram of a satellite receiver of the present invention.

FIG. 1 is a configuration diagram of a general heterodyne receiver in satellite system, and FIG. 2 is a configuration diagram of a satellite receiver of the present invention.

First, referring to FIG. 1, the general heterodyne receiver in satellite system includes an antenna 1, a low noise amplification device 2, an intermediate frequency modulation device 3, an intermediate frequency amplification device 4, a down-frequency modulation device 5, a modem 6, and a plurality of bandpass filters 7*a*, 7*b*, 7*c*, 7*d*, and 7*e*. The plurality of bandpass filters are disposed between each of the components as illustrated in FIG. 1.

The satellite receiver of the present invention is a device in which a variable attenuator is applied to the general heterodyne receiver in satellite system illustrated in FIG. 1.

Referring to FIG. 2, the satellite receiver of the present invention includes an antenna unit 100, a transmission line unit 200, a low-noise block 300, and a modem 400.

In the present invention, the terms referring to each of the components mean the components classified for each function of the heterodyne receiver illustrated in FIG. 1 for convenience of calculation of a noise intensity and a signal-to-noise ratio (SNR) of a satellite signal which will be described below. For example, it is interpreted that the components, from a stage after the antenna to a stage before the low noise amplification device 2 of FIG. 1, correspond to the transmission line unit 200 of the present invention, and the components, from the low noise amplification device 2 to the frequency downconverter device 5 correspond to the low-noise block 300 of the present invention.

Specifically, the antenna unit 100 receives a satellite signal. The transmission line unit 200 includes a bandpass filter 210 for selecting a reception band of the satellite signal and a variable attenuator 220 for generating artificial noise in the satellite signal which passes through the bandpass filter. In the above, the term "artificial noise" means only noise that is generated from the variable attenuator, and does not include noise that is naturally introduced from the outside.

Further, the low-noise block 300 performs low noise amplification and frequency conversion of the satellite signal in which the artificial noise is generated. For example, the low-noise block performs low noise amplification, and frequency amplification.

Further, the modem 400 receives an SNR of the satellite signal from the low-noise block 300.

Generally, added noise is little after low noise amplification is performed, and the noise generated to a stage before the low-noise block 300 occupies a large portion in the satellite receiver. Therefore, the general satellite receiver is designed to reduce the overall noise of the receiver by minimizing a loss caused to the stage before the low noise amplification.

However, the satellite receiver of the present invention is designed to increase the overall noise of the receiver by generating the artificial noise in the satellite signal using the variable attenuator 220 positioned before the low-noise block 300 in reverse concept, and accordingly, the satellite receiver is implemented to allow the receiver to self-adjust a value of the SNR of the satellite signal which is received by the modem by adjusting an intensity of the artificial noise using an attenuation value of the variable attenuator. When the above is applied, it is possible to artificially generate an abnormal communication environment by adjusting the SNR low, and thus the satellite receiver has an advantage of being applicable to a test for modem performance evaluation.

In one example, the low-noise block 300 includes a low noise amplification device 310 that performs low noise amplification and a frequency conversion device 320 that performs frequency conversion, wherein the low noise amplification device 310 and the frequency conversion device 320 may be integrally formed or may be formed separately. The fact that the low noise amplification device 310 and the frequency conversion device 320 are integrally formed means that the low noise amplification device 310 and the frequency conversion device 320 are included in one space, and the fact that the low noise amplification device 310 and the frequency conversion device 320 are formed separately means that each of the low noise amplification device 310 and the frequency conversion device 320 are included in an individual space. Further, the frequency conversion device 320 may include an intermediate frequency modulation device 321, an intermediate frequency amplification device 322, a down-frequency modulation device 323, and several bandpass filters 320*a*, 320*b*, 320*c*, and 320*d*. As can be seen in FIG. 2, the several bandpass filters may each be provided between the amplification device and the modulation device. Referring to FIG. 2, in the satellite receiver of the present invention, the variable attenuator 220 may be positioned at a stage before the low noise amplification device 310.

In one specific example, the satellite receiver of the present invention may adjust the SNR of the satellite signal based on the intensity of the artificial noise generated by the variable attenuator 220.

For example, as the intensity of the artificial noise generated by the variable attenuator 220 is increased, the SNR of the satellite signal may be adjusted to be reduced. Conversely, as the intensity of the artificial noise is reduced, the SNR of the satellite signal may be adjusted to be increased. The variable attenuator 220 may adjust the intensity of the artificial noise by adjusting the attenuation value, and a type of the variable attenuator is not particularly limited and a known device may be used without limitation.

Hereinafter, a process of calculating the intensity of the artificial noise generated by the variable attenuator 220 and the SNR of the satellite signal will be described with reference to equations and general equations below.

First, a method of calculating a noise intensity (also referred to as "noise power") and an SNR of a satellite signal in the general heterodyne receiver in satellite system, which does not include a variable attenuator, as illustrated in FIG. 1 will be described.

A noise temperature $T_{LNB}$ from the low noise amplification device 2 to a stage before the input of the modem 6 is calculated as shown in Equation 1 below.

$$T_{LNB} = T_1 + \frac{T_2}{G_1} + \frac{T_3}{G_1 G_2} \cdots \quad \text{[Equation 1]}$$

In Equation 1 above, $T_i$ denotes an $i^{th}$-stage noise temperature, and $G_i$ denotes an $i^{th}$-stage gain value of an amplification device. For example, $T_1$ denotes a noise temperature of the low noise amplification device 2, $T_2$ denotes a noise temperature of the intermediate frequency modulation device 3, and $T_3$ denotes a noise temperature of the intermediate frequency amplification device 4. Further, $G_1$ denotes a gain value of the low noise amplification device 2, and $G_2$ denotes a gain value of the intermediate frequency modulation device 3.

Meanwhile, since it is common that the gain value of the low noise amplification device 2 tends to be high, Equation 1 above is simplified as in Equation 2 below.

$$T_{LNB} \approx T_1 \quad \text{[Equation 2]}$$

That is, when the gain value $G_1$ of the low noise amplification device 2 is very high, a value of the noise temperature $T_1$ of the low noise amplification device 2 is calculated as the noise temperature $T_{LNB}$ of from the low noise amplification device 2 to a stage before the input (or also referred to as a "stage before the modem") of the modem 6.

Further, a signal strength $S_0$ of a satellite signal is calculated as in Equation 3 below.

$$S_0 = \frac{S_i G_{LNA} G_{IF}}{L_{F1} L_{F2} L_{MIF} L_{F3} L_{MLF} L_{F_5}} = S_i G_{SYS} \quad \text{[Equation 3]}$$

In Equation 3 above, $S_i$ denotes a strength of the satellite signal which passes through the antenna 1, $G_{LNA}$ denotes a gain value of the low noise amplification device 2, $G_{IF}$ denotes a gain value of the intermediate frequency modulation device 3, $L_{MIF}$ denotes a loss value of the intermediate frequency amplification device 4, $L_{MLF}$ denotes a loss value of the down-frequency modulation device 5, $L_{F1}$ denotes a loss value of the bandpass filter #1 7*a*, $L_{F2}$ denotes a loss value of the bandpass filter #2 7*b*, $L_{F5}$ denotes a loss value of the bandpass filter #5 7*e*, and $G_{SYS}$ denotes a gain value of the satellite receiver.

Summarizing the above, a noise intensity $N_0$ of the satellite signal in the general heterodyne receiver in satellite system is calculated as in Equation 4 below.

$$\begin{aligned} N_0 &= (N_i + kBT_{TL+REC})G_{SYS} \quad \text{[Equation 4]} \\ &= kB(T_A + T_{TL+REC})G_{SYS} \\ &= kB[T_A + (L_{F1} - 1)T_{room} + L_{F1}T_{REC}]G_{SYS} \end{aligned}$$

In Equation 4 above, k denotes the Boltzmann constant, B denotes a bandwidth of the satellite receiver, $T_A$ denotes a noise temperature of the antenna, $T_{room}$ denotes an ambient temperature, and $N_i$ denotes a noise intensity of the satellite signal which passes through the antenna 1. $G_{SYS}$ denotes an overall gain value of the satellite receiver. More specifically, $G_{SYS}$ may be a gain value of from a stage after the antenna to a stage before the input of the modem.

Further, the SNR of the satellite signal is calculated as in Equation 5 below, and the calculated SNR of the satellite signal is input to the modem 400.

$$\begin{aligned} SNR &= \frac{S_0}{N_0} \quad \text{[Equation 5]} \\ &= \frac{S_i G_{SYS}}{kB[T_A + (L_{F1} - 1)T_{room} + L_{F1}T_{REC}]G_{SYS}} \\ &= \frac{S_i}{kB[T_A + (L_{F1} - 1)T_{room} + L_{F1}T_{REC}]} \end{aligned}$$

In Equation 5 above, $S_i$ denotes a power of the satellite signal which passes through the antenna 1, k denotes the Boltzmann constant, B denotes a bandwidth of the satellite receiver, $T_A$ denotes the noise temperature of the antenna, $T_{room}$ denotes the ambient temperature, $L_{F1}$ denotes the loss value of the bandpass filter, $L_{AT}$ denotes a loss value of the variable attenuator, $T_{REC}$ denotes a noise temperature of an SNR output unit, and $G_{SYS}$ denotes an overall gain value of the satellite receiver.

Hereinafter, a method of calculating a noise intensity and an SNR of a satellite signal in the satellite receiver of the present invention, which includes a variable attenuator, will be described.

Unlike Equation 4 described above, in the satellite receiver of the present invention, which includes the variable attenuator, a noise intensity $N_0$ of a satellite signal is calculated using General Equation 1 below.

$$\begin{aligned} &\text{[General Equation 1]} \\ N_0 &= (N_i + kBT_{TL+AT+REC})G_{SYS} \\ &= kB(T_A + T_{TL+AT+REC})G_{SYS} \\ &= kB[T_A + (L_{F1} - 1)T_{room} + (L_{AT} - 1)T_{room} + L_{F1}L_{AT}T_{LNB}]G_{SYS} \end{aligned}$$

In General Equation 1 above, k denotes the Boltzmann constant, B denotes a bandwidth of the satellite receiver, $T_A$ denotes a noise temperature of the antenna, $T_{room}$ denotes an ambient temperature, $L_{F1}$ denotes a loss value of the bandpass filter 210, $L_{AT}$ denotes a loss value of the variable attenuator 220, $T_{LNB}$ denotes a noise temperature of the low-noise block 300, and $G_{SYS}$ denotes an overall gain value of the satellite receiver. For example, the noise temperature $T_{LNB}$ of the low-noise block 300 refers to a noise temperature of from the low noise amplification device 310 to a stage before the input of the modem 400.

Further, unlike Equation 5 described above, in the satellite receiver of the present invention, the SNR of the satellite signal is calculated using General Equation 2 below.

$$\begin{aligned} SNR &= \frac{S_0}{N_0} \quad \text{[General Equation 2]} \\ &= \frac{S_i G_{SYS}}{kB[T_A + (L_{F1} - 1)T_{room} + (L_{AT} - 1)T_{room} + L_{F1}L_{AT}T_{LNB}]G_{SYS}} \\ &= \frac{S_i}{kB[T_A + (L_{F1} - 1)T_{room} + (L_{AT} - 1)T_{room} + L_{F1}L_{AT}T_{LNB}]} \end{aligned}$$

In General Equation 2 above, $S_i$ denotes a power of the satellite signal which passes through the antenna unit 100, k denotes the Boltzmann constant, B denotes a bandwidth of the satellite receiver, $T_{room}$ denotes an ambient temperature, $L_{F1}$ denotes a loss value of the bandpass filter 210, $L_{AT}$ denotes a loss value of the variable attenuator 220, and $T_{LNB}$ denotes the noise temperature of the low-noise block 300.

From General Equations 1 and 2 above, it can be confirmed that the loss value caused by the variable attenuator 220 may affect the noise temperature of the satellite receiver, and it means that the SNR of the satellite signal can be adjusted by the variable attenuator 220.

The present invention also relates to a method of evaluating performance of the modem 400 using the above-described satellite receiver.

For example, the method includes adjusting an SNR of a satellite signal to a standard value for evaluating the performance of the modem 400 based on an intensity of artificial noise generated by the variable attenuator, and when the SNR adjusted to the standard value is input to the modem 400, evaluating the performance of the modem 400 using a bit error rate (BER) value.

Further, the method of the present invention may further include calculating a noise intensity $N_0$ of the satellite signal using General Equation 1 below.

$$\begin{aligned} &\text{[General Equation 1]} \\ N_0 &= (N_i + kBT_{TL+AT+REC})G_{SYS} \\ &= kB(T_A + T_{TL+AT+REC})G_{SYS} \\ &= kB[T_A + (L_{F1} - 1)T_{room} + (L_{AT} - 1)T_{room} + L_{F1}L_{AT}T_{LNB}]G_{SYS} \end{aligned}$$

In General Equation 1 above, k denotes the Boltzmann constant, B denotes a bandwidth of the satellite receiver, $T_A$ denotes a noise temperature of the antenna, $T_{room}$ denotes an ambient temperature, $L_{F1}$ denotes a loss value of the bandpass filter 210, $L_{AT}$ denotes a loss value of the variable attenuator 220, $T_{LNB}$ denotes a noise temperature of the low-noise block 300, and $G_{SYS}$ denotes an overall gain value of the satellite receiver.

Further, the method of the present invention may further include calculating the output SNR of the satellite signal using General Equation 2 below.

$$
\begin{aligned}
SNR &= \frac{S_0}{N_0} \\
&= \frac{S_i G_{SYS}}{kB[T_A + (L_{F1} - 1)T_{room} + (L_{AT} - 1)T_{room} + L_{F1}L_{AT}T_{LNB}]G_{SYS}} \\
&= \frac{S_i}{kB[T_A + (L_{F1} - 1)T_{room} + (L_{AT} - 1)T_{room} + L_{F1}L_{AT}T_{LNB}]}
\end{aligned}
\quad \text{[General Equation 2]}
$$

In General Equation 2 above, $S_i$ denotes a strength of the satellite signal which passes through the antenna unit 100, k denotes the Boltzmann constant, B denotes a bandwidth of the satellite terminal receiver, $T_{room}$ denotes an ambient temperature, $L_{F1}$ denotes a loss value of the bandpass filter 210, $L_{AT}$ denotes a loss value of the variable attenuator 220, and $T_{LNB}$ denotes a noise temperature of the low-noise block 300.

Since a detailed description related to the calculating overlaps the above, it will be omitted below.

In one embodiment, assuming the specification that the performance of the modem of the satellite receiver is checked for a BER under a condition that an SNR is 9 dB, in the case of the heterodyne receiver (comparative example) in satellite system, which does not include a variable attenuator, as illustrated in FIG. 1, under parameter conditions shown in Table 1 below, the SNR is calculated as 30.2 dB using Equations 1 to 5 described above. On the other hand, in the case of the heterodyne receiver in satellite system (example) of the present invention, which includes the variable attenuator, as illustrated in FIG. 2, when a value of the variable attenuator is 20.1 dB, an SNR is calculated as 8.99 dB using General Equations 1 and 2 described above, and from this, it can be seen that the SNR is adjusted by the variable attenuator.

TABLE 1

| | Parameters | | | | | |
|---|---|---|---|---|---|---|
| | $T_{room}$ | $T_A$ | $L_{F1}$ | B | $T_{LNB}$ | $S_i$ |
| Values | 300K | 100K | 1.6 dB | 1 MHz | 320K | −80 dBm |

From the above examples and comparative examples, it can be seen that the satellite receiver of the present invention may self-adjust the SNR of the satellite signal without adjusting a transmission strength of the terminal repeater or using a noise generating instrument.

While the exemplary embodiments of the present invention are disclosed for the purpose of illustration, and those skilled in the art may make various modifications, changes, and additions within the spirit and scope of the present invention, and the modifications, changes, and additions may be interpreted as being included in the appended claims.

REFERENCE NUMERALS

100: ANTENNA UNIT
200: TRANSMISSION LINE UNIT
300: LOW-NOISE BLOCK
400: MODEM

What is claimed is:

1. A satellite receiver comprising:

an antenna unit configured to receive a satellite signal;

a transmission line unit including a bandpass filter for selecting a reception band of the satellite signal and a variable attenuator for generating artificial noise in the satellite signal which passes through the bandpass filter;

a low-noise block configured to perform low noise amplification and frequency conversion of the satellite signal in which the artificial noise is generated; and a modem configured to receive a signal-to-noise ratio (SNR) of the satellite signal from the low-noise block, wherein a noise intensity (NO) of the satellite signal is calculated using General Equation 1 below:

$$
N_0 = kB[T_A + (L_{F1} - 1)T_{room} + (L_{AT} - 1)T_{room} + L_{F1}L_{AT}T_{LNB}]G_{SYS} \quad \text{[General Equation 1]}
$$

in General Equation 1 above, k denotes the Boltzmann constant, B denotes a bandwidth of the satellite receiver, TA denotes a noise temperature of the antenna unit, Troom denotes an ambient temperature, LF1 denotes a loss value of the bandpass filter, LAT denotes a loss value of the variable attenuator, TLNB denotes a noise temperature of the low-noise block, and GSYS denotes an overall gain value of the satellite receiver.

2. The satellite receiver of claim 1, wherein the low-noise block includes a low noise amplification device that performs low noise amplification and a frequency conversion device that performs frequency conversion, and the low noise amplification device and the frequency conversion device are integrally formed or are formed separately.

3. The satellite receiver of claim 1, wherein the SNR of the satellite signal is adjusted based on an intensity of the artificial noise generated by the variable attenuator.

4. The satellite receiver of claim 3, wherein, as the intensity of the artificial noise generated by the variable attenuator is increased, the SNR of the satellite signal is adjusted to be reduced.

5. The satellite receiver of claim 1, wherein the SNR of the satellite signal is calculated using General Equation 2 below:

$$
SNR = \frac{S_i}{kB[T_A + (L_{F1} - 1)T_{room} + (L_{AT} - 1)T_{room} + L_{F1}L_{AT}T_{LNB}]} \quad \text{[General Equation 2]}
$$

in General Equation 2 above, Si denotes a strength of the satellite signal which passes through the antenna unit, k denotes the Boltzmann constant, B denotes the bandwidth of the satellite receiver, Troom denotes the ambient temperature, LF1 denotes the loss value of the bandpass filter, LAT denotes the loss value of the variable attenuator, and TLNB denotes the noise temperature of the low-noise block.

6. A method of evaluating performance of a modem using the satellite receiver according to claim 1, the method comprising:

adjusting a signal-to-noise ratio (SNR) of a satellite signal to a standard value for evaluating the performance of the modem based on an intensity of artificial noise generated by a variable attenuator; and when the SNR adjusted to the standard value is input to the modem, evaluating the performance of the modem using a bit error rate (BER) value;

wherein the method further comprises calculating a noise intensity (N0) of the satellite signal using General Equation 1 below:

$$N_0 = kB[T_A + (L_{F1} - 1)T_{room} + (L_{AT} - 1)T_{room} + L_{F1}L_{AT}T_{LNB}]G_{SYS} \quad \text{[General Equation 1]}$$

in General Equation 1 above, k denotes the Boltzmann constant, B denotes a bandwidth of the satellite receiver, TA denotes a noise temperature of the antenna unit, Troom denotes an ambient temperature, LF1 denotes a loss value of the bandpass filter, LAT denotes a loss value of the variable attenuator, TLNB denotes a noise temperature of the low-noise block, and GSYS denotes an overall gain value of the satellite receiver.

7. The method of claim 6, further comprising calculating the SNR of the satellite signal using General Equation 2 below:

$$SNR = \frac{S_i}{kB[T_A + (L_{F1} - 1)T_{room} + (L_{AT} - 1)T_{room} + L_{F1}L_{AT}T_{LNB}]} \quad \text{[General Equation 2]}$$

in General Equation 2 above, Si denotes a strength of the satellite signal which passes through the antenna unit, k denotes the Boltzmann constant, B denotes the bandwidth of the satellite receiver, Troom denotes the ambient temperature, LF1 denotes the loss value of the bandpass filter, LAT denotes the loss value of the variable attenuator, and TLNB denotes the noise temperature of the low-noise block.

* * * * *